(No Model.)

D. SMITH.
APPARATUS FOR PRESERVING EGGS.

No. 250,985. Patented Dec. 13, 1881.

Witnesses
S. N. Piper
E. S. Pratt

Inventor.
Dexter Smith.
by R. H. Eddy atty.

United States Patent Office.

DEXTER SMITH, OF LITCHFIELD CORNER, MAINE.

APPARATUS FOR PRESERVING EGGS.

SPECIFICATION forming part of Letters Patent No. 250,985, dated December 13, 1881.

Application filed October 28, 1881. (No model.)

*To all whom it may concern:*

Be it known that I, DEXTER SMITH, of Litchfield Corner, of the county of Kennebec and State of Maine, have invented a new and useful Improvement in Egg-Preservers; and I do hereby declare the same to be described in the following specification and represented in the accompanying drawings, in which—

Figure 1:
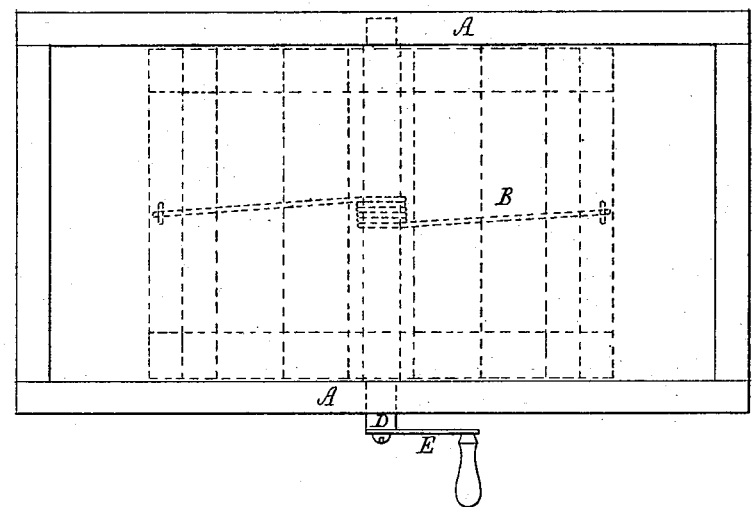
Figure 2:
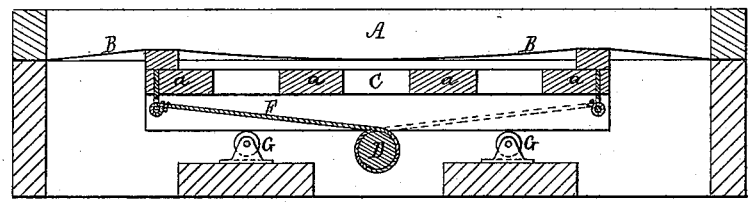
Figure 3:
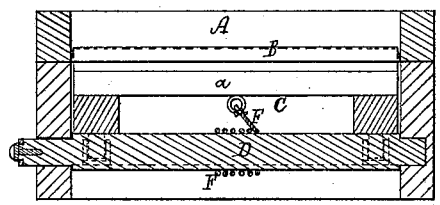

Figure 1 is a top view, Fig. 2 a longitudinal section, and Fig. 3 a transverse section, of an ovarator or mechanism embodying my invention, which is a combination consisting of not only a trough or case and an apron extending horizontally and loosely across such, but of a grid arranged directly underneath the said apron and provided with means or mechanism for reciprocating it (the said grid) lengthwise thereof, all being substantially as hereinafter explained, and as represented in the accompanying drawings.

It is well known that in order to preserve eggs or prevent their yolks from adhering to their shells, and thereby soon causing decay or decomposition of the liquid contents of the shells, it becomes necessary occasionally to turn the eggs, so as to cause their yolks to rest on different parts of the shells. My invention is for this purpose, and also to receive and hold eggs until such times as they may be wanted for sale or use.

In the drawings, A denotes the trough or case, usually made like an ordinary drawer, it having within and extended loosely across it from side to side and end to end of it an apron or piece of cloth, B, such apron or cloth resting upon the reciprocating grid C, whose bars *a* extend transversely across it, the two extreme or end bars of the grid being somewhat higher than the intermediate ones.

The grid rests on a windlass or rotary shaft, D, provided with a crank, E, and extended across the case. A line, F, attached at its two opposite ends of the grid and wound tightly at its middle about the windlass or shaft, enables a person, on turning the crank, to move the grid lengthwise in one direction or the reverse beneath the apron, or, in other words, to reciprocate the grid. The eggs, being placed on the apron, will, on the grid being so moved, be caused to revolve more or less, and thus by simply turning the crank all the eggs that may be resting on the apron will be simultaneously rotated. Furthermore, the grid is supported in its movements by rollers G, secured to the frame.

A series of drawers, each fitted with an apron and grid and device for reciprocating the latter, as described, will be found to be an excellent means of holding eggs and preserving them from decay.

I do not claim a sieve arranged in a frame and provided with mechanism for reciprocating it (the said sieve) within such frame.

What I claim as my invention is—

The improved egg-preserver, substantially as described, consisting of the trough or case A, apron B, and the reciprocating grid C, provided with means or mechanism for operating it, essentially and for the purpose as set forth.

DEXTER SMITH.

Witnesses:
R. H. EDDY,
E. B. PRATT.